(12) United States Patent
Doh et al.

(10) Patent No.: US 6,835,467 B2
(45) Date of Patent: Dec. 28, 2004

(54) CLAD PLATES FOR CORROSION RESISTANCE AND FABRICATING METHOD THEREOF

(75) Inventors: Jung Mann Doh, Seoul (KR); Ji Young Byun, Seoul (KR); Kyu Won Cho, Seoul (KR); Ju Yong Jung, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 10/346,141

(22) Filed: Jan. 16, 2003

(65) Prior Publication Data

US 2004/0048096 A1 Mar. 11, 2004

(30) Foreign Application Priority Data

Aug. 9, 2002 (KR) .................. 10-2002-0047095

(51) Int. Cl.[7] ................. B32B 15/00; B32B 15/04; B32B 15/18; B32B 15/20
(52) U.S. Cl. ................. 428/681; 428/680; 428/679; 428/678; 428/676; 428/674; 428/660; 428/662
(58) Field of Search ................. 428/660, 662, 428/661, 674, 675, 676, 677, 678, 679, 680, 681, 610, 609

(56) References Cited

U.S. PATENT DOCUMENTS

| 4,034,454 A | * | 7/1977 | Galasso et al. ............. 428/576 |
| 4,433,230 A | * | 2/1984 | Sano et al. ................. 219/118 |
| 4,674,675 A | * | 6/1987 | Mietrach .................... 228/194 |
| 4,705,207 A | * | 11/1987 | Norris ........................ 228/194 |
| 4,715,525 A | * | 12/1987 | Norris ........................ 228/194 |
| 4,988,035 A | * | 1/1991 | Ueno et al. ................. 228/175 |

* cited by examiner

Primary Examiner—Michael La Villa
(74) Attorney, Agent, or Firm—Darby & Darby (57) ABSTRACT

Disclosed are a structure of multi-layered clad plates and sheets for corrosion resistance and a fabricating method thereof. Provided are clad plates and sheets for corrosion resistance in which Ni, Co, Ti, Nb, V, and Zr having an excellent corrosion resistance, or an alloy thereof are bonded to cheap Fe, Cu, or an alloy thereof. Chemical compositions of the clad metals and structures of the clad plates and sheets are easily modified with service conditions of the clad plates and sheets. Also, this invention provides a more cost-effective method based on a resistance seam welding process for fabricating the corrosion-resistant clad plates and sheets.

3 Claims, 6 Drawing Sheets

CLAD PLATES FOR CORROSION RESISTANCE AND FABRICATING METHOD THEREOF

BACKGROUND OF THE INVENTION

1. Field of the Invention

The present invention relates to clad plates and/or sheets with an excellent corrosion resistance property and a fabricating method thereof.

2. Description of the Background Art

Clad plates and/or sheets are composed of a clad metal and a substrate. For corrosion-resistant clad plates, the clad metal can be selected among the following materials due to their excellent corrosion resistance; stainless steels, Ni, Ni alloys, Co, Co alloys, Ti, Ti alloys, Ta, Ta alloys, Nb, Nb alloys, V, V alloys, Zr, and Zr alloys. The substrate can be selected among the Fe, Fe alloys, Cu, and Cu alloys which have enough mechanical properties for constructing a structure. The corrosion-resistant clad plates are used as a core material for heat exchangers, reaction vessels for chemical plants, ships, paper industries, constructions, bridges, pressure vessels, desalination and electric facilities, flue gas desulfurization plants, etc.

The clad plate consists of two layers of a clad metal/a substrate or three layers of a clad metal/an insert metal/a substrate, or more than three layers of a clad metal/insert metals/a substrate. The thickness of the clad metal is in the range of 5% and 50% of that of the substrate.

A basic function of the clad metal is to protect the substrate from the environment such as corrosion, chemicals, heat, wear, etc.

The insert metal layers takes a role of increasing the bonding strength between the clad metal and the substrate. The insert metal layers restrain a movement of elements such as Fe and C towards the clad metal from the substrate and prevent generation of the carbides and intermetallic compounds which make the interface between the clad metal and the substrate brittle.

The substrate should have enough mechanical properties to support the building structures.

The clad plates and sheets have been fabricated mainly by a roll bonding, an explosive welding, a spot welding, and a resistance seam welding. Among these methods, the resistance seam welding is known to be the cheapest method for fabricating the large-area clad plates and sheets. The explosive welding, the roll bonding, the spot welding, and the resistance seam welding have the following advantages and disadvantages.

The explosive welding: Since the substrate and the clad metal are bonded within a short time by an explosive energy of a gunpowder, the insert metal layer is not needed and the explosive welding method gives the most excellent bonding strength. However, a fabricating cost is expensive, a factory installation site is limited by a loud explosive noise generated at the time of the gunpowder explosion, and it is impossible to fabricate a large sheet and a thin sheet. Also, in case that the substrate is a thin plate, the substrate can be distorted by an explosive force of the gunpowder, thereby lowering ductility.

The roll bonding: The roll bonding, which bonds the substrate and the clad metal using a rolling mill, can fabricate the large clad plates and sheets cheaply. However, it requires an expensive installation cost (the rolling mill and a vacuum furnace). Also, since the bonding is performed at a high temperature, the brittle carbides and intermetallic compounds can be easily generated at the interface between the base metal and the clad metal.

The spot welding: Since the spot welding has to be performed many times in order to fabricate the clad plates and sheets having an excellent bonding strength, much time is required to the bonding, a bonding strength is low, and a complete sealing between the clad metal and the substrate is difficult.

The resistance seam welding: Since the substrate and the clad metal are placed between two electrodes and then an electric current and a pressure are simultaneously applied to the electrodes to bond the substrate and the clad metal within a short time, a bonding portion is scarcely oxidized. Also, the large clad plates and sheets of a circle shape and a straight line shape having an excellent bonding strength can be fabricated, and an installation cost and a fabricating cost are the cheapest.

In Japanese Showa Entetsu, the clad plates and sheets having a structure of the clad metal/the insert metal (net/thin sheet)/the substrate is fabricated by the resistance seam welding and used as a raw material of a heat exchanger, a chemical plant, and a flue gas desulfurization lining. In case that the clad plates and sheets for corrosion resistance is fabricated by a method developed in the Japanese Showa Entetsu, the metal net is stuck into the clad metal, so that the thickness of clad metal layer becomes thinner and the bonding strength between the clad metal and the substrate is lowered due to incomplete bonding.

On the other hand, in Korean Jungwon engineering company, C276/steel clad plates and sheets having an excellent bonding strength (300~360 MPa) are being produced by the resistance seam welding. The C276/steel clad plates and sheets are being used as a raw material of a flue gas desulfurization chimney lining. Recently, Jungwon developed the technique based on the resistance seam welding is for manufacturing Ti/steel clad plates and sheets. However, the interface between Ti and steel was uneven and the bonding strength was 200 MPa, lower than that of the C276/steel clad plates and sheets. Such a low bonding strength can result in the separation of the Ti clad metal and the steel substrate when the Ti/steel clad plates are used in a real plant. Accordingly, in order to commercialize the corrosion-resistant clad plates and sheets which are composed of the corrosion-resistant clad metal (Ni alloys, Co alloys, Ti, Ta, Nb, V, Zr, etc.) and the substrate (Fe, Fe alloys, Cu, Cu alloys), the interface bonding has to be excellent and a fabricating technique for the clad plates and sheets having an excellent bonding strength is required.

In the conventional method for fabricating the clad plates and sheets, the insert metal layer is inserted between the clad metal and the substrate and then at high temperatures heat or heat/pressure is applied, so that the different metals are bonded by a solid state diffusion reaction between the clad metal and the insert metal layer or the insert metal layer and the substrate. Accordingly, in case of fabricating the clad plates and sheets by bonding the clad metal which is not easily bonded like Ti to the different substrate metal, the bonding is insufficient and the bonding strength is low. Especially, in the resistance seam method, the clad metal sheet to be bonded and an electrode have to be contacted within a short time and bonded within a short time by the solid state diffusion, thereby having a problem in bonding completely. Also, in order to use the clad plates and sheets widely, the bonding strength has to be excellent and a cost of the clad plates and sheets has to be cheap.

SUMMARY OF THE INVENTION

Therefore, an objective of the present invention is to provide clad plates and sheets having an excellent bonding strength between the clad metal and the substrate.

Another objective of the present invention is to provide a fabricating method of the clad plates and sheets by which a bonding is performed within a short time and a fabricating cost is reduced.

Still another objective of the present invention is to provide the clad plates and sheets for corrosion resistance having an excellent bonding strength by a resistance seam welding, in which another metal having an eutectic reaction with the clad metal is inserted as an insert metal layer with one layer or multi-layers between the clad metal and the substrate and then an electric current and a pressure are simultaneously applied.

The foregoing and other objectives, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In the corrosion-resistant clad plates and sheets, another metals called as insert metals, which result in a eutectic reaction with the clad metal and form a low melting eutectic phase, are inserted to an interface between the clad metal and the substrate. Occurrence of the eutectic reaction helps the clad metal quickly bond to the substrate through the insert metal layer and improves the bonding strength in the clad plates. In the present invention, the eutectic reaction can be occurred at an interface between the clad metal and the substrate or at an interface between the clad metal and the metal layer inserted between the clad metal and the base metal and the clad metal, thereby promoting to make an alloy between different metals and obtaining an excellent bonding. The intermediate layer inserted between the clad metal and the base metal reacts with the clad metal to perform a low melting point eutectic reaction. Also, different insert metals can be selected according to types of the clad metal and the substrate in order to have an excellent bonding.

The present invention has two main characteristics. First, structures of the clad plates and sheets have to be designed to induce an eutectic reaction at the interface between the clad metal and the insert metal layer. Second, the eutectic reaction is generated at the interface between the clad metal and the insert metal layer or at the interface between the clad metal and the substrate by properly controlling a processing factor of the resistance seam welding, thereby fabricating the corrosion-resistant clad plates and sheets having an excellent bonding strength.

Besides the resistance seam welding, the corrosion-resistant clad plates and sheets can be fabricated by an explosive welding, a roll bonding, or a mixing method thereof for additionally rolling the clad plates and sheets fabricated by the explosive welding. Among these methods, the resistance seam welding has an excellent cost competitiveness since the large-sized clad plates and sheets are fabricated cheaply by the method.

A structure of the clad plates and sheets is a double layered structure composed of the clad metal and the substrate or a multi-layered structure composed of the clad metal, the insert metal layer, and the substrate.

As the clad metal, Ti, Ti alloys, Nb, Nb alloys, V, V alloys, Zr, or Zr alloys are suitable. As the substrate, Fe or Fe alloys, Cu or Cu alloys, Ni or Ni alloys are suitable. The insert metal layer placed between the clad metal and the substrate includes Co, Co alloys, Cu, Cu alloys, Fe, Fe alloys, Ni, or Ni alloys, but it is not limited to these. According to kinds of the clad metal, the insert metal layer can be differently selected. For example, Fe- and Ni-based amorphous alloys, Ag—Cu alloys, Ag—Cu—Zn alloys, Cu—Ni alloys, Cu—Zn alloys, Cu—Ni—Zn alloys, etc., which are widely used as a raw material for brazing, can also be used as the insert metal layer.

To fabricate the corrosion-resistant clad plates and sheets having an excellent bonding strength, first of all, an oxidized layer on the clad metal is removed by a shot-pinning process. As a stack structure of the clad plates and sheets, the i insert metal layer is stacked on the substrate and thereon the clad metal is stacked. To the stacked plates and sheets, an electric current and a pressure are simultaneously applied, thereby fabricating the multi-layered clad plates and sheets for corrosion resistance having an excellent bonding strength (on the average, more than 250 MPa).

Figure 1A:
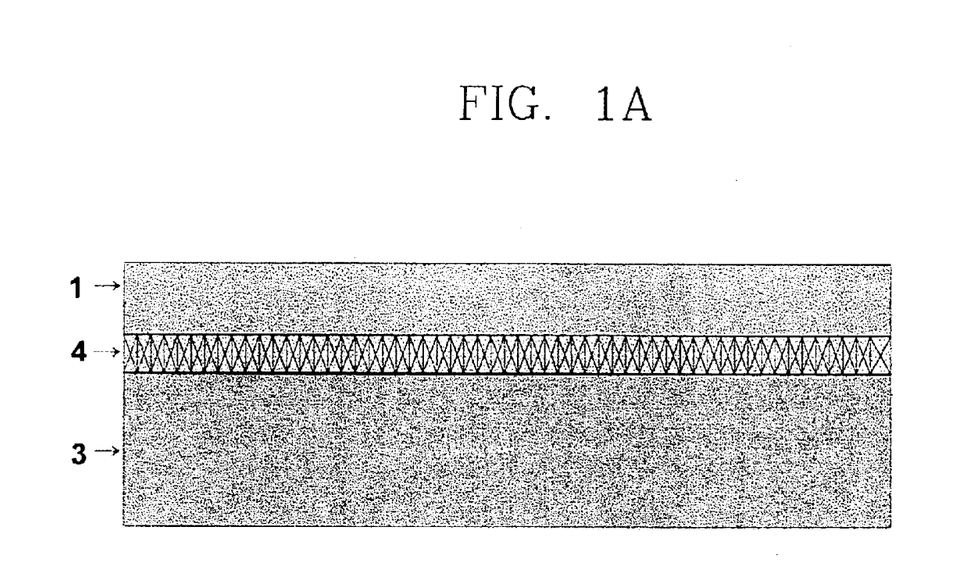
FIG. 1A is a schematic sectional view showing a structure of clad plates and sheets according to the present invention.
Figure 1B:
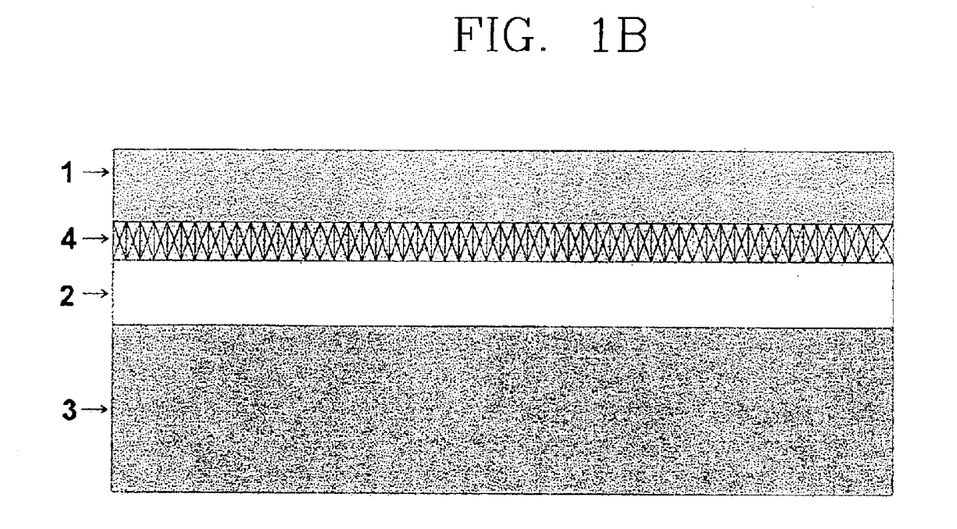
FIG. 1B is a schematic sectional view showing another structure of clad plates and sheets according to the present invention.
Figure 1C:
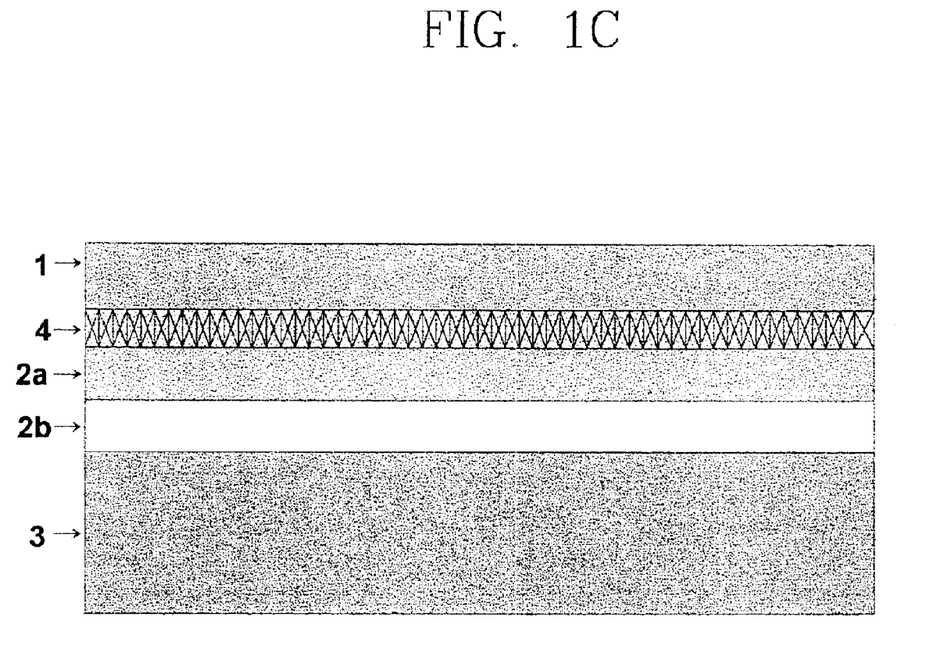
FIG. 1C is a schematic sectional view showing still another structure of clad plates and sheets according to the present invention.

A schematic structure of the multi-layered clad plates and sheets is shown in FIGS. 1A to 1C. In case that the clad metal and the substrate react together to form a low-melting eutectic phase, the clad metal 1 can be directly bonded to the substrate 3 without any insert metal layer and then the eutectic reaction layer 4 is generated at the interface between the clad metal 1 and the base metal 3, thereby having a structure of the clad metal, the eutectic reaction layer, and the substrate.

In case that the clad metal and the substrate do not react each other, as shown in FIG. 1B, the insert metal layer 2 having the eutectic reaction with the clad metal is placed to the interface between the clad metal 1 and the base metal 3, thereby having a four-layer structure of the clad metal, the eutectic reaction layer, the insert metal layer, and the substrate.

In the meantime, as shown in FIG. 1C, the insert metal layer placed to the interface between the clad metal and the substrate can be constructed as a multi-layered structure more than two layers. In case that the insert metal layers 2a and 2b more than two layers are placed to the interface between the clad metal 1 and the base metal 3, as shown in FIG. 1C, the eutectic reaction layer 4 has to be indispensably formed at a contact part between the clad metal 1 and the insert metal layer 2a. However, the eutectic reaction layer does not have to be indispensably formed at the interface between the insert metal layer 2a and the other insert metal layer 2b and at the interface between the insert metal layer 2b and the substrate 3. The insert metal layer 2b contacted to the substrate can be constructed as one layer or multi-layers more than two layers.

The fabricating conditions for the multi-layered clad plates and sheets for corrosion resistance are summarized as follows:

a size of the substrate (length×width×thickness): 2000× 1000×(5~25)mm a size of the clad metal (length×width×thickness): 2000× 1000×(0.5~3.0) mm a size of the insert metal layer (length×width×thickness): 2000×(15~40)×(0.01~0.15)mm electric current: 7000~25000 A welding time: 5~40 cycle/sec cooling time: 5~40 cycle/sec applied pressure: 1~1500 kg f/m$^2$ kinds of electrode: Cu or Cu alloys electrode thickness: 5~30 mm welding speed: 50~100 mm/min By using the resistance seam welding process, the corrosion-resistant clad plates and sheets having an excellent shear strength (200~300 MPa) can be fabricated.

In the present invention, the eutectic reaction is occurred at the interface between the clad metal and the substrate or the clad metal and the insert metal layer to bond the different metals, so that the insert metal layer contacted to the clad metal has to be pure metals or alloys thereof which causes the eutectic reaction with the clad metal. Even if the insert metal layer placed between the clad metal and the substrate can be dependent on kinds of the metal to be bonded, the following metals can be usually selected as the insert metal layer: Ni, Ni alloys, Co, Co alloys, Cu, Cu alloys, Fe, Fe alloys, etc.

Hereinafter, the present invention will be explained with the preferred embodiments.

Preferred Embodiment 1: the Clad Sheets

Since Cu (pure Cu or a Cu-alloy) and Ni (pure Ni or a Ni-alloy) react with Ti to form a low-melting eutectic phase, one of them or a stack of the Cu and Ni sheets is inserted to an interface between the Ti (pure Ti or a Ti-alloy) and the substrate (Fe, a Fe-alloy, Cu, a Cu-alloy, Ni, or a Ni-alloy). Then, by using the resistance seam welding, the multi-layered clad plates and sheets are fabricated. At this time, a used electric current is 11~13 kA and a pressure is 3~5 kgf/cm$^2$.

As shown in FIG. 1, when the Ti and Cu (pure Cu or a Cu-alloy) is used as a clad metal and a substrate, respectively, a structure of the clad plates becomes one among the stacks of Ti/Cu, Ti/Ni/Cu, and Ti/Cu/Ni/Cu. In case that Ni (pure Ni, or an Ni-alloy) or Fe (pure Fe, or an Fe-alloy) is used as the substrate, a structure of the clad plates becomes one among the stacks of Ti/Ni, Ti/Cu/Ni, and Ti/Ni/Cu/Ni or of Ti/Fe, Ti/Cu/Fe, Ti/Ni/Fe, Ti/Cu/Ni/Fe, and Ti/Ni/Cu/Fe, respectively. Herein, the Ti, Cu, Ni, Fe mean pure metals or alloys. The Cu, the Ni, and the Fe react with the Ti clad metal to form the low-melting eutectic phase and can be bonded to the Ti without any insert metal layers.

However, direct bonding of the Fe and the Ti (FIG. 1A structure) is not easy, because brittle products are formed at a high temperature. This problem can be solved by selecting a proper insert metal layer as shown in FIGS. 1B and 1C.

In case that the pure Cu or a Cu alloy is used as an insert metal layer, Cu can diffuse to the Fe substrate along its grain boundary. It causes the grain boundary brittleness of the Fe substrate and hence it is not proper to fabricate the clad plates and sheets shown in FIG. 1B by using only Cu as the insert metal layer. Accordingly, when the Ti is used as the clad metal, proper structures of the clad plates and sheets are Ti/Cu, Ti/Ni, Ti/Ni/Fe, Ti/Cu/Ni, Ti/Ni/Cu, Ti/Cu/Ni/Fe, Ti/Cu/Ni/Cu, and Ti/Ni/Cu/Ni, because these structures do not cause the brittleness at the interface between the clad metal and the insert metal layer or the interface between the insert metal layer and the substrate.

Also, the lowest eutectic temperatures in Ti—Cu and Ti—Ni binary systems are 880 and 942° C., respectively, which are lower than 1085° C. corresponding to the lowest eutectic temperature in the Ti—Fe binary system. Accordingly, if Cu- or Ni-based insert metal layer is used, a bonding is possible at a temperature lower than that of a direct bonding of the Ti and the Fe without using any insert metal layers (Refer to Table 1).

Figure 2A:
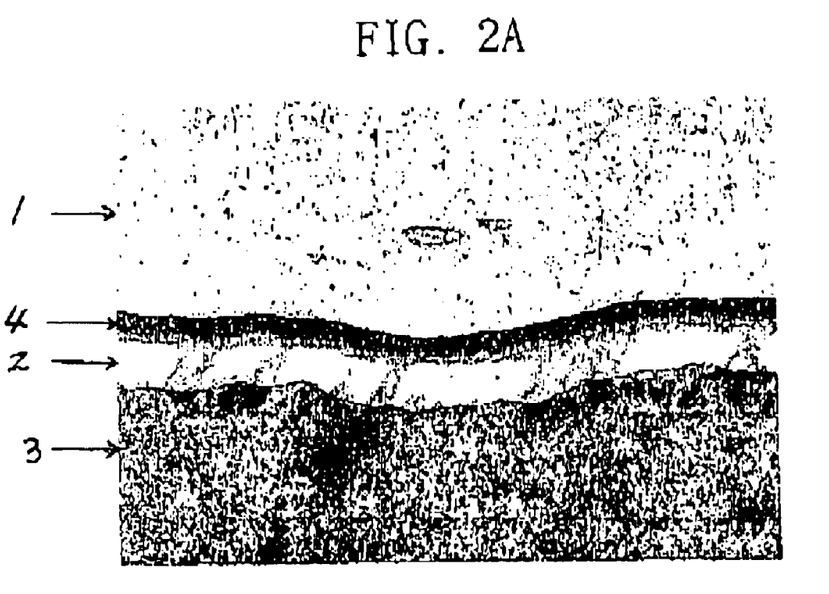
FIGS. 2A and 2B are microstructures of the cross-section of Ti/Ni/Fe clad plates fabricated by the present invention.
Figure 2B:
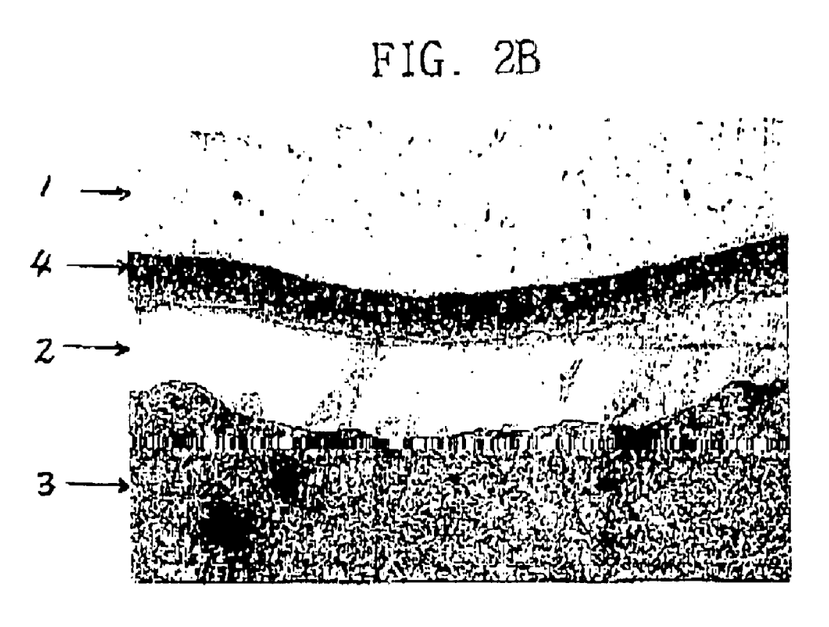
Figure 3A:
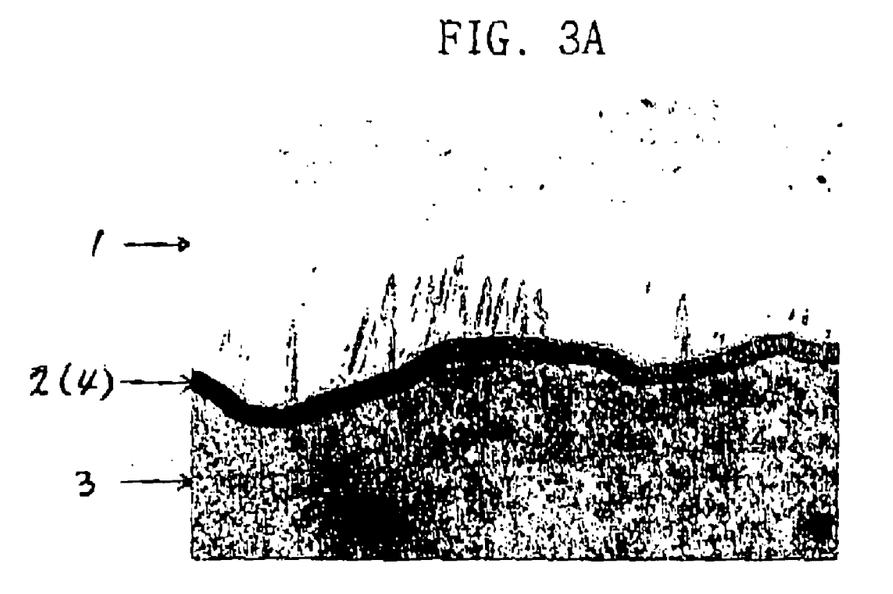
FIGS. 3A and 3B are microstructures of the cross-section of Ti/Cu/Fe clad plates fabricated by the present invention.
Figure 3B:
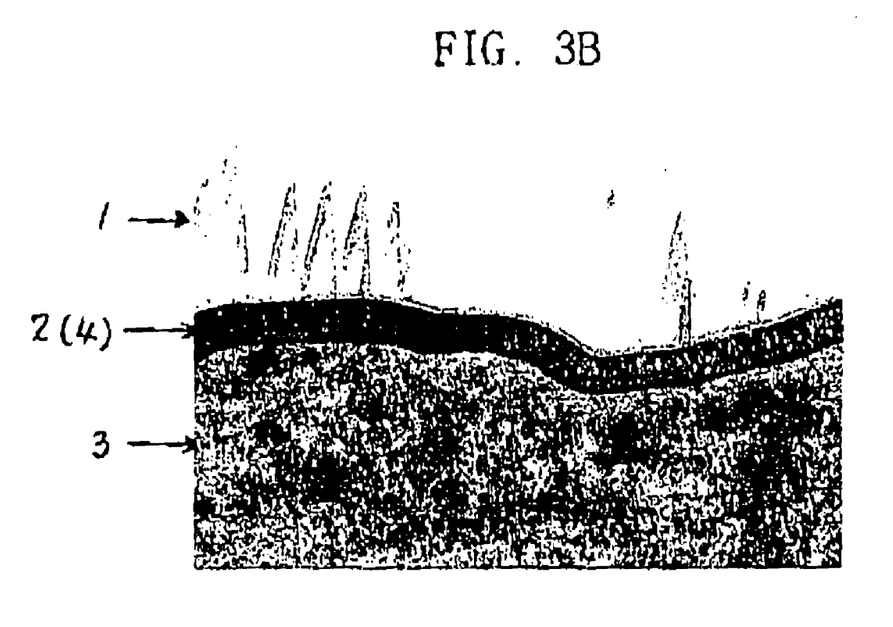
Figure 4A:
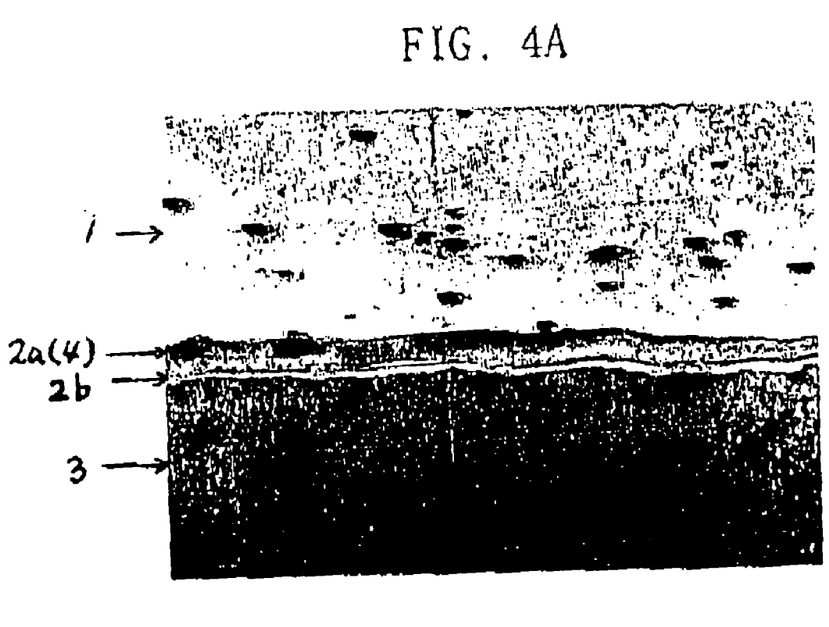
FIGS. 4A and 4B are structure photos of Ti/Cu/Ni/Fe clad sheets fabricated by the present invention.
Figure 4B:
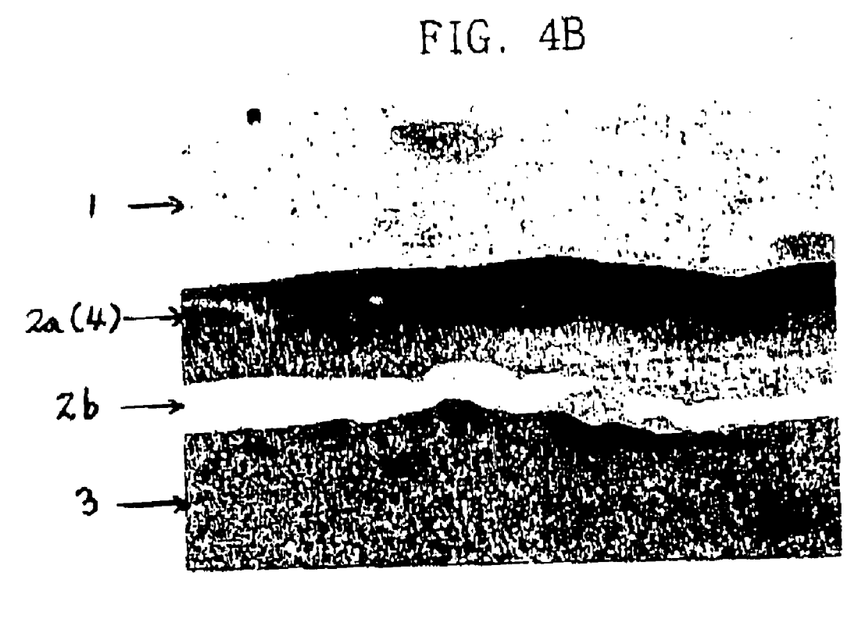
Figure 5A:
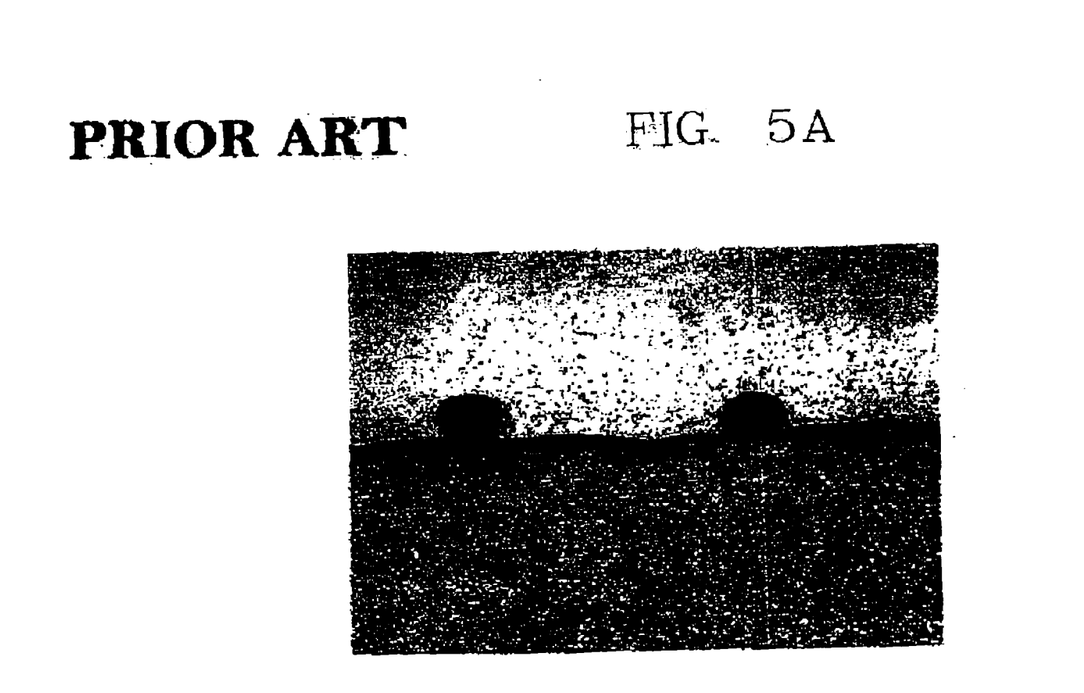
FIGS. 5A and 5B are microstructures of the cross-section of Ti/Stainless-Net/Ni/Fe clad plates fabricated according to the conventional art.
Figure 5B:
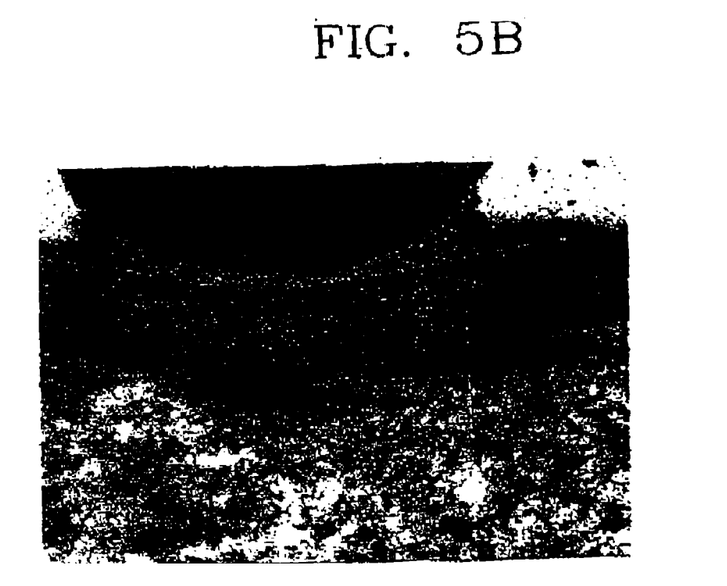

FIGS. 2A and 2B are microstructures of the cross-section of the Ti/Ni/Fe clad plates fabricated by the present invention, FIGS. 3A and 3B are microstructures of the cross-section of Ti/Cu/Fe clad plates fabricated by the present invention, FIGS. 4A and 4B are microstructures of the cross-section of Ti/Cu/Ni/Fe clad plates fabricated by the present invention, and FIG. 5 is microstructures of the cross-section of Ti/stainless-net/Ni/Fe clad plates fabricated by the conventional art. The reference numbers on these Figures correspond to the clad sheets of FIGS. 1A–1C.

In the clad plates fabricated according to the present invention, it is clearly observed that the eutectic reaction layer is formed at the interface between the Ti clad metal and the insert metal layer. It shows different microstructures from that observed in the clad plates fabricated by the conventional art.

TABLE 1

Stacking structures for the clad plates and sheets and eutectic temperatures between the Ti clad metal and the insert metal or substrate.

| Clad metal | Insert metal layer | Substrate | Eutectic temperature, ° C. | Peeling off |
|---|---|---|---|---|
| Ti | X | Fe | 1085 | No |
| Ti | X | Cu | 880 | No |
| Ti | X | Ni | 942 | No |
| Ti | Ni | Fe | 942 | No |
| Ti | Cu | Fe | 880 | No |
| Ti | Cu | Ni | 880 | No |
| Ti | Ni | Cu | 942 | No |
| Ti | Cu/Ni | Fe | 880 | No |
| Ti | Cu/Ni | Cu | 880 | No |
| Ti | Ni/Cu | Fe | 942 | No |
| Ti | Ni/Cu | Ni | 942 | No |

As shown in table 1, Ti, Cu, Ni, and Fe are pure metals or alloys whose main components are themselves, and Cu/Ni and Ni/Cu indicate that the insert metal layer is constructed as two layers.

Preferred Embodiment 2. Zr Clad Plates and Sheets

Cu (pure Cu or a Cu-alloy), Ni (pure Ni or an Ni-alloy), and Co (pure Co or a Co-alloy) are inserted to an interface between Zr (pure Zr or a Zr-alloy) and the substrate (Fe, an Fe-alloy, Cu, a Cu-alloy, Ni, or an Ni-alloy) independently or together one another, thereby stacking with multi-layers. Then, by using the resistance seam welding, the clad plates and sheets are fabricated. At this time, a used electric current is 11~13 kA and a pressure is 3–5 kgf/cm².

As shown in table 2, a structure of the Zr clad plates and sheets is Zr/Cu, Zr/Ni/Cu, Zr/Co/Cu, and Zr/Fe/Cu in case that the substrate is Cu (pure Cu, or a Cu-alloy), Zr/Ni, Zr/Cu/Ni, Zr/Co/Ni, Zr/Fe/Ni, Zr/Co/Fe/Ni, Zr/Fe/Co/Ni, Zr/Cu/Fe/Ni, and Zr/Fe/Cu/Ni in case that the substrate is Ni (pure Ni, or an Ni-alloy), and Zr/Fe, Zr/Cu/Fe, Zr/Ni/Fe, Zr/Cu/Ni/Fe, Zr/Ni/Cu/Fe, Zr/Co/Fe, Zr/Co/Ni/Fe, and Zr/Ni/Co/Fe in case that the substrate is Fe (pure Fe, or an Fe-alloy). Herein, the Zr, Co, Cu, Ni, and Fe mean pure metals or alloys.

Since Fe, an Fe-alloy, Cu, or a Cu-alloy react with Zr to form a low-melting eutectic phase, the insert metal layer does not have to be inserted to fabricate the two-layer clad plates and sheets.

In the table 2, Zr, Co, Cu, Ni, and Fe are pure metals and alloys whose main components are themselves, and Cu/Ni, Ni/Cu, Co/Cu, Cu/Co, Co/Fe, Fe/Co, Co/Ni, and Ni/Co indicate that the insert metal layer is constructed as two layers. And Cu/Ni/Co, Cu/Co/Ni, Ni/Cu/Co, Ni/Co/Cu, Co/Cu/Ni, and Co/Ni/Cu indicate that the insert metal layer is constructed as three layers.

Preferred Embodiment 3. Nb Clad Plates and Sheets

Ni (pure Ni or an Ni-alloy) and Co (pure Co or a Co-alloy) having an eutectic reaction with Nb are inserted between Nb (pure Nb or an Nb-alloy) and the substrate (Fe, an Fe-alloy, Ni, or an Ni-alloy) independently or together, thereby stacking with multi-layers. Then, by using the resistance seam welding, the clad plates and sheets are fabricated. At this time, a used electric current is 11~13 kA and a pressure is 3–5 kgf/cm².

As shown in table 3, a structure of the Nb clad plates and sheets is Nb/Fe, Nb/Ni, Nb/Co/Fe, Nb/Co/Ni, Nb/Ni/Fe, Nb/Co/Ni/Fe, Nb/Ni/Co/Fe, and Nb/Ni/Co/Ni. Herein, Nb, Co, Ni, and Fe are pure metals or alloys.

Since the eutectic temperatures of the Nb—Ni, Nb—Co, and Nb—Fe binary systems are 1175, 1237, and 1371° C., respectively. This means that use of Co or Ni as the insert metal is more suitable in terms of lowering the bonding temperature.

Since Fe or an Fe-alloy react with Nb to form a low-melting eutectic phase, two-layer clad plates and sheets of Nb/Fe without the insert metal layer such as Ni or Co can be fabricated.

However, use of Co or Ni as the insert metal is more suitable, because the eutectic temperature in Fe—Nb binary is as high as 1371° C.

In the table 3, Nb, Co, Ni, and Fe are pure metals and alloys whose main components are themselves, and Ni/Co and Co/Ni indicate that the insert metal layer is constructed as two layers.

TABLE 2

Stacking structures for the clad plates and sheets and eutectic temperatures between the Zr clad metal and the insert metal or substrate.

| Clad metal | Insert metal layer | Substrate | Eutectic temperature, ° C. | Peeling off |
|---|---|---|---|---|
| Zr | X | Fe | 928 | No |
| Zr | X | Cu | 890 | No |
| Zr | X | Ni | 960 | No |

TABLE 2-continued

Stacking structures for the clad plates and sheets and eutectic temperatures between the Zr clad metal and the insert metal or substrate.

| Clad metal | Insert metal layer | Substrate | Eutectic temperature, ° C. | Peeling off |
|---|---|---|---|---|
| Zr | Co | Fe | 981 | No |
| Zr | Co | Cu | 981 | No |
| Zr | Co | Ni | 981 | No |
| Zr | Cu | Fe | 880 | No |
| Zr | Cu | Ni | 890 | No |
| Zr | Ni | Fe | 960 | No |
| Zr | Ni | Cu | 960 | No |
| Zr | Cu/Ni | Cu | 880 | No |
| Zr | Cu/Ni | Fe | 880 | No |
| Zr | Ni/Cu | Fe | 960 | No |
| Zr | Ni/Cu | Ni | 960 | No |
| Zr | Co/Cu | Ni | 981 | No |
| Zr | Co/Cu | Fe | 981 | No |
| Zr | Cu/Co | Ni | 890 | No |
| Zr | Cu/Co | Fe | 890 | No |
| Zr | Cu/Co | Cu | 890 | No |
| Zr | Co/Fe | Ni | 981 | No |
| Zr | Co/Fe | Cu | 981 | No |
| Zr | Fe/Co | Fe | 928 | No |
| Zr | Fe/Co | Ni | 928 | No |
| Zr | Fe/Co | Cu | 928 | No |
| Zr | Co/Ni | Fe | 981 | No |
| Zr | Co/Ni | Cu | 981 | No |
| Zr | Ni/Co | Fe | 960 | No |
| Zr | Ni/Co | Ni | 960 | No |
| Zr | Ni/Co | Cu | 960 | No |
| Zr | Cu/Ni/Co | Fe, Ni, Cu | 890 | No |
| Zr | Cu/Co/Ni | Fe, Ni, Cu | 890 | No |
| Zr | Ni/Cu/Co | Fe, Ni, Cu | 960 | No |
| Zr | Ni/Co/Cu | Fe, Ni, Cu | 960 | No |
| Zr | Co/Cu/Ni | Fe, Ni, Cu | 981 | No |
| Zr | Co/Ni/Cu | Fe, Ni, Cu | 981 | No |

TABLE 3

Stacking structures for the clad plates and sheets and eutectic temperatures between the Nb clad metal and the insert metal or substrate.

| Clad metal | Insert metal layer | Substrate | Eutectic temperature, ° C. | Peeling off |
|---|---|---|---|---|
| Nb | X | Fe | 1371 | No |
| Nb | X | Ni | 1175 | No |
| Nb | Co | Fe | 1237 | No |
| Nb | Co | Ni | 1237 | No |
| Nb | Ni | Fe | 1175 | No |
| Nb | Ni/Co | Fe | 1175 | No |
| Nb | Ni/Co | Ni | 1175 | No |
| Nb | Co/Ni | Fe | 1237 | No |

Preferred Embodiment 4. V Clad Plates and Sheets

Ni (pure Ni or an Ni-alloy) and Co (pure Co or a Co-alloy) having an eutectic reaction with V are inserted between V (pure V or a V-alloy) and the substrate (Fe, an Fe-alloy, Ni, or an Ni-alloy) independently or together, thereby stacking with multi-layers. Then, by using the resistance seam welding, the clad plates and sheets are fabricated. At this time, a used electric current is 11~13 kA and a pressure is 3–5 kgf/cm².

As shown in table 4, a structure of the V clad plates and sheets is V/Ni, V/Co/Fe, V/Ni/Fe, V/Co/Ni/Fe, V/Ni/Co/Fe, and V/Ni/Co/Ni. Herein, V, Co, Ni, and Fe are pure metals and alloys thereof. The eutectic temperatures of V—Ni and V—Co binary systems are 1205 and 1248° C., respectively, and by inserting the insert metal layer such as Co or Ni to the interface between the V and the Fe-alloy, the V clad plates and sheets are fabricated.

In the table 4, V, Co, Ni, and Fe are pure metals and alloys whose main components are themselves, and Ni/Co and Co/Ni indicate that the insert metal layer is constructed as two layers.

TABLE 4

Stacking structures for the clad plates and sheets and eutectic temperatures between the V clad metal and the insert metal or substrate.

| Clad metal | Intermediate | Substrate | Eutectic temperature | Peeling off |
|---|---|---|---|---|
| V | X | Ni | 1202 | No |
| V | Co | Fe | 1248 | No |
| V | Ni | Fe | 1202 | No |
| V | Ni/Co | Fe | 1202 | No |
| V | Ni/Co | Ni | 1202 | No |
| V | Co/Ni | Fe | 1248 | No |

According to the present invention, a technique to fabricate the corrosion-resistant clad plates and sheets with a cheap cost was developed. Especially, in the present invention, the expensive thin clad metals such as Ti, Nb, V, and Zr are bonded to the cheap Fe, an Fe-alloy, Cu, a Cu-alloy, Ni, or an Ni-alloy, thereby reducing a fabricating cost of the corrosion-resistant clad plates and sheets by application of the resistance seam welding process. Also, by inserting the insert metal layer between the clad metal and the substrate, the clad metal is bonded to the insert metal layer by the eutectic reaction of the insert metal with the clad metal. At the interface between the insert metal with the clad metal, a low-melting eutectic phase is formed. This makes the present invention distinguishable from the conventional other processes. Formation of the low-melting eutectic phase also lowers the bonding temperature and improves the bonding strength. The clad plates and sheets having an excellent bonding strength (on the average more than 250 MPa) fabricated according to the present invention are expected to be widely used as a core material for heat exchangers, reaction vessels for chemical plants, ships, paper industries, constructions, bridges, pressure vessels, desalination and electric facilities, flue gas desulfurization plants, etc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. Clad plates for corrosion resistance comprising:
a substrate of a plate shape of the pure metal or an alloy of Fe;
a clad metal of a plate shape stacked on one side of said substrate and of the pure metal or an alloy of Zr;
an insert metal between said substrate and said clad metal for bringing about an eutectic reaction of said substrate with said clad metal, said insert metal being of at least one material selected from the group consisting of the pure metal or an alloy of Cu, Fe, Ni, and Co; and
an eutectic reaction layer formed at an interface between said insert metal and said clad metal for bonding said insert metal and clad layers to form clad plates stacked in the order of clad metal/ insert metal substrate of one of Zr/Cu/Fe, Zr/Ni/Fe, Zr/Cu/Ni/Fe, Zr/Ni/Cu/Fe, Zr/Co/X/Fe, Zr/Cu/X/Fe, Zr/Ni/X/Fe, and Zr/Fe/X/Fe, with the Ni, Cu, Fe and Co of a first layer of said insert metal being a pure metal or an alloy, and X corresponding to a second layer of said insert metal of a pure metal or an alloy whose melting point is higher than an eutectic temperature of a system of the Zr clad metal and said first layer of said insert metal.

2. Clad plates for corrosion resistance comprising:
a substrate of a plate shape of the pure metal or an alloy of Fe;
a clad metal of a plate shape stacked on one side of said substrate and of the pure metal or an alloy of Nb;
an insert metal between said substrate and said clad metal for bringing about an eutectic reaction of said substrate with said clad metal, said insert metal being of at least one material selected from the group consisting of the pure metal or an alloy of Cu, Fe, Ni, and Co; and
an eutectic reaction layer formed at an interface between said insert metal layer and said clad metal for bonding said insert metal and clad layers to form clad plates stacked in the order of clad metal/ insert metal/substrate of one of Nb/Co/Fe, Nb/Ni/Fe, Nb/Co/Ni/Fe, Nb/Ni/Co/Fe, Nb/Co/X/Fe, and Nb/Ni/X/Fe, with the Co and Ni of a first layer of said insert metal being a pure metal or an alloy, and X corresponding to a second layer of said insert metal is a pure metal or an alloy whose melting point is higher than an eutectic temperature of a system of said Nb clad metal and said first layer of said insert metal.

3. Clad plates for corrosion resistance comprising:
a substrate of a plate shape of the pure metal or an alloy of Fe;
a clad metal of a plate shape stacked on one side of said substrate and of a material selected from the group consisting of the pure metal or an alloy of V;
an insert metal between said substrate and said clad metal for bringing about an eutectic reaction of said substrate with said clad metal, said insert metal being of at least one material selected from the group consisting of the pure metal or an alloy of Cu, Fe, Ni, and Co; and
an eutectic reaction layer formed at an interface between said insert metal layer and said clad metal for bonding said insert metal and clad layers to form clad plates stacked in the order of clad metal/ insert metal substrate of one of V/Co/Fe, V/Ni/Fe, V/Co/Ni/Fe, V/Ni/Co/Fe, V/Ni/X/Fe and V/Co/X/Fe, with the Co and Ni of a first layer of said insert metal being a pure metal or an alloy, and X corresponding to a second layer of said insert metal is a pure metal or an alloy whose melting point is higher than an eutectic temperature of a system of said V clad metal and said first layer of said insert metal.

* * * * *